United States Patent [19]
Jones

[11] 4,091,789
[45] May 30, 1978

[54] STRATIFIED CHARGE FUEL INJECTION SYSTEM FOR ROTARY ENGINE

[75] Inventor: Charles Jones, Hillsdale, N.J.

[73] Assignee: Curtiss-Wright Corporation, Wood-Ridge, N.J.

[21] Appl. No.: 767,820

[22] Filed: Feb. 11, 1977

[51] Int. Cl.² ............................................. F02B 53/10
[52] U.S. Cl. ................................ 123/205; 123/32 AA
[58] Field of Search ................... 123/8.09, 8.11, 8.13, 123/30 R, 30 A, 32 A, 32 AA, 32 J, 32 AH; 239/135, 139

[56] References Cited

U.S. PATENT DOCUMENTS

| | | | |
|---|---|---|---|
| 2,065,025 | 12/1936 | Ricardo | 123/32 AA UX |
| 2,120,768 | 6/1938 | Ricardo | 123/32 AA UX |
| 2,719,514 | 10/1955 | Schilling | 123/32 AA UX |
| 2,932,289 | 4/1960 | Witzky | 123/32 A UX |
| 3,044,454 | 7/1962 | Sutton | 123/32 A UX |
| 3,387,595 | 6/1968 | Bentele | 123/8.09 |
| 3,894,518 | 7/1975 | Gavrun et al. | 123/8.09 |

FOREIGN PATENT DOCUMENTS

| | | | |
|---|---|---|---|
| 152,420 | 9/1951 | Australia | 123/32 A |
| 973,933 | 7/1960 | Germany | 123/32 A |
| 52,433 | 10/1920 | Sweden | 123/32 A |

Primary Examiner—Carlton R. Croyle
Assistant Examiner—Michael Koczo, Jr.
Attorney, Agent, or Firm—Arthur Frederick

[57] ABSTRACT

The improved stratified charge fuel injection system for a rotary engine has a fuel nozzle for injecting fuel into each engine working chamber coacting with an igniter at a common recess opening into the engine working chambers to ignite the fuel discharging from the nozzle. The improvement comprises heat retention means for the common recess so that the walls thereof become relatively hot and thereby promotes evaporation of the fuel discharging from the fuel nozzle.

2 Claims, 5 Drawing Figures

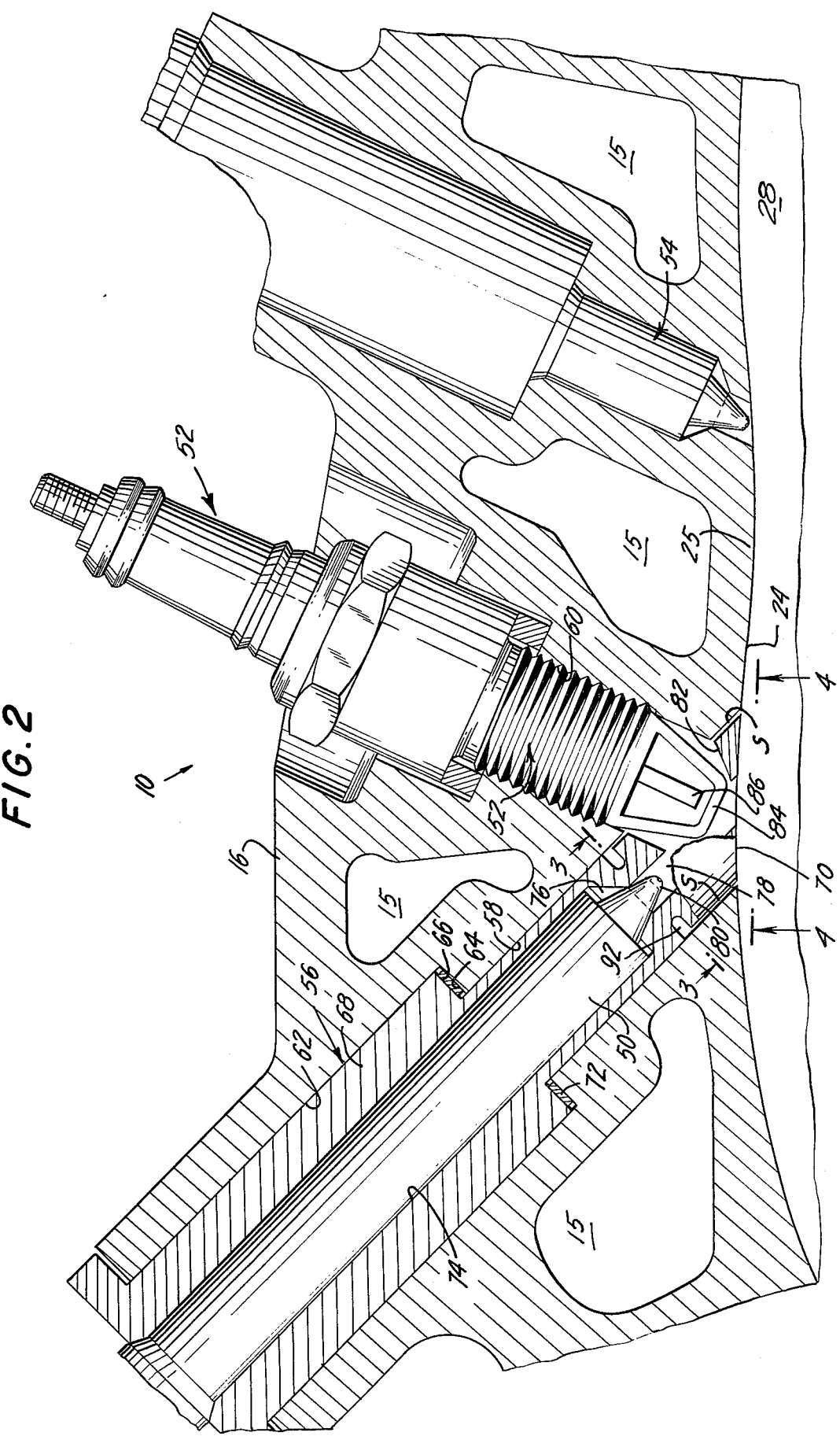

4,091,789

STRATIFIED CHARGE FUEL INJECTION SYSTEM FOR ROTARY ENGINE

BACKGROUND OF THE INVENTION

This invention relates to stratified fuel injection systems for rotary piston internal combustion engines and, more specifically, relates to an improvement in such systems having a fuel injection nozzle which coacts with an igniter to ignite the fuel discharging from the fuel injection nozzle. This type of stratified charge fuel injection system is disclosed in the following U.S. patents:

U.S. Pat. No. 3,246,636—Bentele—Apr. 19, 1966
U.S. Pat. No. 3,698,364—Jones—Oct. 17. 1972
U.S. Pat. No. 3,894,518—Gavrun et al—July 15, 1975

As explained in the above mentioned Gavrun et al U.S. patent, stratified charge fuel injection systems for rotary internal combustion engines are a recognized approach to the solution of exhaust pollution and fuel consumption of rotary internal combustion engines. As also explained in the aforesaid Gavrun et al patent, stratified charge operation contemplates a fuel-air mixture or charge in each working chamber of the engine which is not a uniform or a stoichiometric mixture and instead has at least one region where the fuel-air mixture is relatively rich. In the fuel injection-ignition devices where the fuel nozzle is located inwardly from the working chamber only sufficiently far enough to provide space for the igniter, it has been found that the recess common to the nozzle and igniter tends to be built up with carbon deposits which interferes with the desired fuel spray pattern past the igniter and into the working chamber. This buildup of deposits is attributed to the relatively cool surfaces of the common recess from which heat is conducted through the housing. Also the cool surfaces of the common recess have been found to chill the fuel and entrained air flowing past the surfaces and resulting in some incomplete combustion and/or firing irregularity. These problems are not present in precombustion chamber systems such as exemplified in the U.S. patent to Bentele, U.S. Pat. No. 3,387,595 dated June 11, 1968 where a portion of the precombustion chamber is insulated from the engine housing. In these systems, the fuel-air mixture is confined to the vicinity of the spark plug so that the chilling effect has minimal adverse effect on achieving light-off with regularity. In fact, effort is made in precombustion chamber systems to cool the chamber in varous ways such as fins and cooling fluid passages in the vicinity of the chamber. This chilling effect on the fuel-air mixture is of particular concern in achieving optimum firing regularity and engine performance where the nozzle and igniter coacts to produce a pilot flame to ignite the main fuel charge emitted into the working chambers by a second nozzle.

Accordingly, it is an object of this invention to provide an improved stratified charge fuel injection system for a rotary piston, internal combustion engine wherein more complete combustion of fuel is achieved with the attendant reduction in pollutants in the exhaust emissions and improvement in fuel economy.

It is a further object of the present invention to provide an improved stratified charge fuel injection system for a rotary piston internal combustion engine wherein regularity of firing (ignition) is optimized.

SUMMARY OF THE INVENTION

Accordingly, the present invention contemplates an improved stratified charge fuel injection system for a rotary internal combustion engine having a housing forming a cavity in which a rotor is eccentrically supported for planetary rotation so as to form a plurality of working chambers defined between the rotor and housing which successively expand and contract in volumetric size as the rotor planetates relative to the housing. The housing has an intake port means for introducing air (may contain a small quantity of fuel) into the working chambers and an exhaust port means for discharging products of combustion from the working chambers.

The improved stratified charge fuel injection system comprises first and second openings in the housing intercommunicating with each other and having a common recess opening into the housing cavity. The system also includes a fuel injection nozzle disposed in the first opening for discharging fuel into each working chamber, through the said common recess, after the air charge in the working chamber has been substantially compressed. An igniter is disposed in the second opening for igniting fuel discharging from the fuel nozzle. A heat retention means is provided for the common recess along at least a part of the path of fuel discharge from said fuel injection nozzle to promote vaporization of at least some of the fuel passing said heat retention means.

In a narrower aspect of the invention, the heat retention means is a sleeve lining the common recess and at least partially spaced from the walls of the common recess so that heat transfer to the housing is minimized.

BRIEF DESCRIPTION OF THE DRAWINGS

The invention will be more fully understood from the following detailed description thereof when considered in connection with the accompanying drawing wherein but one embodiment of the invention is illustrated by way of example and in which:

FIG. 2 is a fragmentary enlargement of the engine illustrated in FIG. 1 showing in greater detail the stratifid charge fuel injection system of this invention;

DESCRIPTION OF THE PREFERRED EMBODIMENT

Figure 1:
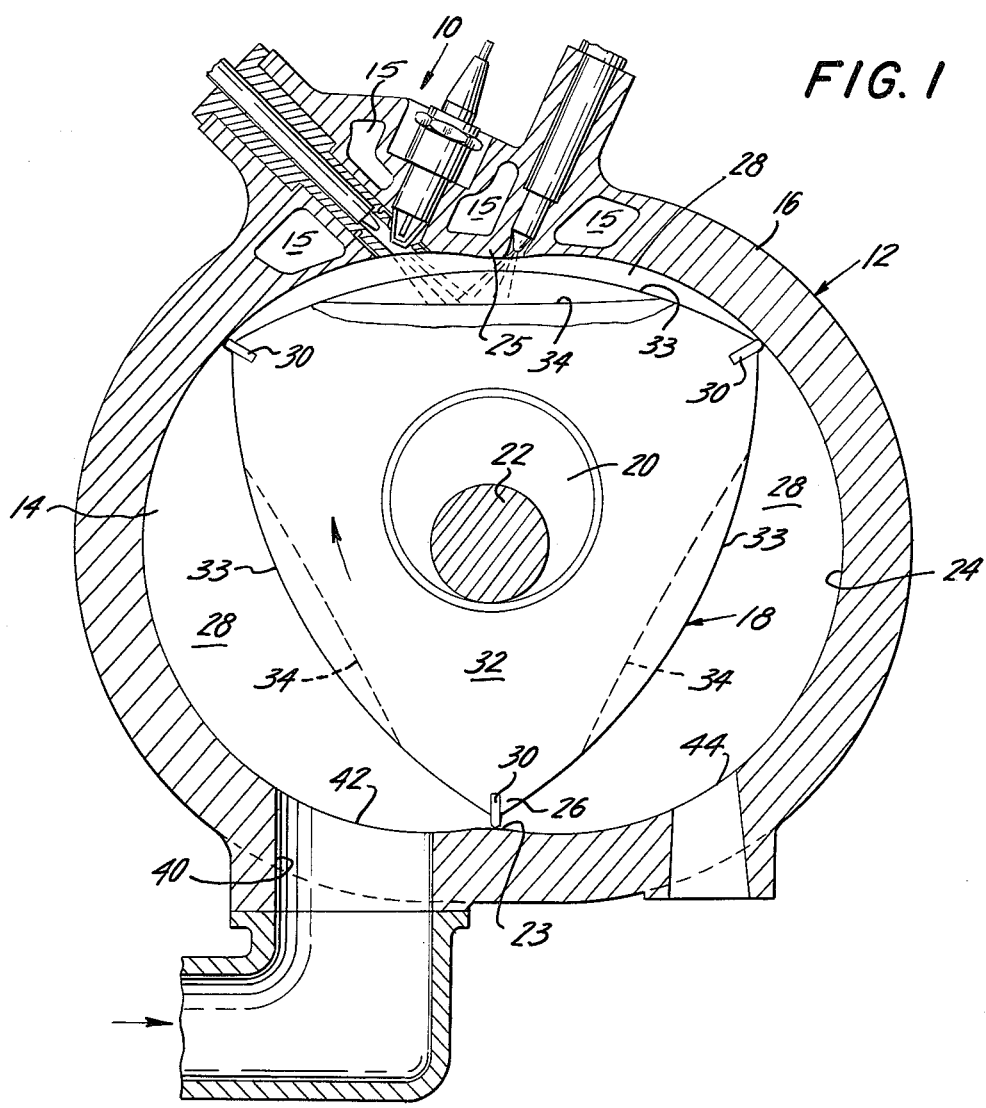
FIG. 1 is a cross-sectional schematic view of a rotary internal combustion engine having a stratified charge fuel injection system, according to this invention.
Figure 4:
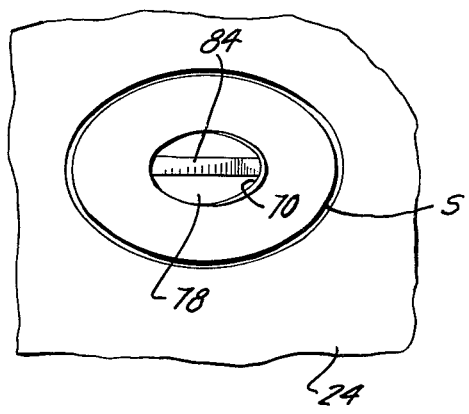
FIG. 4 is a fragmentary cross-sectional view taken along line 4—4 of FIG. 2.
Figure 3:
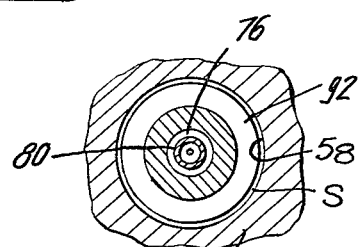
FIG. 3 is a view in cross-section taken substantially along line 3—3 of FIG. 2.
Figure 5:
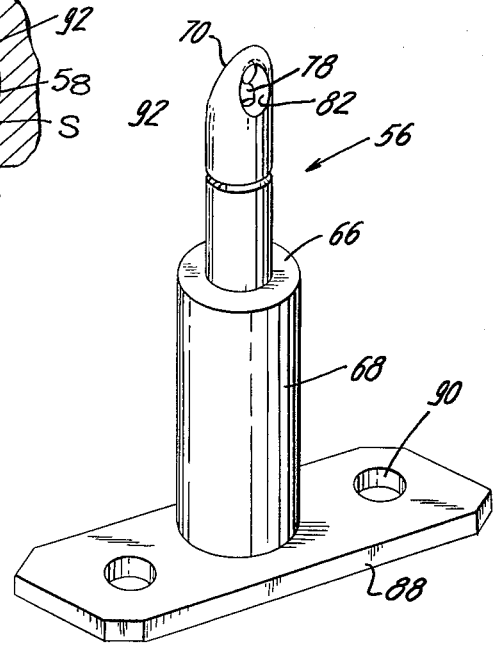
FIG. 5 is a perspective view of a sleeve forming part of the stratified fuel injection system.

Now referring to the drawings and, more particularly, to FIG. 1, the reference number 10 generally designates the improved stratified fuel injection system according to this invention, which system is shown in a rotary piston, internal combustion engine 12. While engine 12 is illustrated in FIG. 1 and will be described as a rotary combustion engine of the Wankel type disclosed in U.S. patent to Wankel et al, U.S. Pat. No. 2,988,065, dated June 13, 1951, the stratified fuel injection system 10 is not limited to ue in such engine. It is to be understood that the stratified fuel injecton system 10 has application to other rotary internal combustion engines, such as those of the configuration disclosed in the British Patent to Maillard, No. 583,035, dated Dec.

5, 1946; the French Patent to Planche, No. 590,085, dated June 10, 1925; and the British Patent to Cooley, No. 6,168, dated July 2, 1903, without departing from the scope and spirit of the invention.

The engine 12 comprises an outer body or housing consisting of two axially spaced end walls 14 (only one of which is shown) and an intermediate wall or rotor housing 16, the housings being secured together to form a housing cavity therebetween. An inner body, rotary piston or rotor 18 is journaled for rotation within said housing cavity on an eccentric portion 20 of a shaft 22 which extends coaxially through and is supported in bearings (not shown) in the end housing walls 14. The axis of the shaft 22 is perpendicular to the inner surfaces of the end walls 14.

The peripheral inner surface 24 of the intermediate wall 16 is illustrated as having a two-lobe profile which is basically epitrochoidal in configuration, the two lobes joining at junctions 23 and 25. The rotor 18 has a generally triangular profile with apex portions 26 having sealing cooperation with the epitrochoidal surface 24 to form three working chambers 28 between the rotor and the housing walls 14 and 16. For this purpose, the rotor carries a seal grid which includes seals 30 at each of the apex portions of rotor 18 and suitable seals (not shown) in the end faces 32 for sealing engagement with the inner surfaces of housing end walls 14. Each of the flank surfaces 33 of rotor 18 is preferably provided with a recess or pocket 34.

The engine 12 also includes suitable timing gears (not shown) between the rotor 18 and the engine housing to maintain the angular relationship of the rotor, housing and shaft; such timing gears are conventional and may be similar to those illustrated in the patents to Bentele et al, U.S. Pat. No. 3,111,261, dated Nov. 19, 1963 and Jones et al, U.S. Pat. No. 3,655,302, dated Apr. 11, 1972.

An air intake passage 40 in the housing supplies air which may contain some fuel to the air intake port 42 disposed adjacent to and to one side of the lobe junction 23, which port opens into a working chamber 28 to pass air into the latter for compression. An exhaust port 44 is provided in intermediate wall 16 adjacent to and on the opposite side of lobe juncture 23 from intake port 42. The fuel combustion in working chambers 28 is initiated by stratified charge injection system 10 in the vicinity of the other lobe junction 25.

The engine 12, as thus far described, functions with rotor 18 rotating in the direction of the arrow in FIG. 1, so that each working chamber 28 periodically increases from a minimum volume condition, when it is located adjacent to the lobe junction 23 and opens the intake port 42, to a maximum volume condition and closes the intake port and then said chamber decreases in volume to compress the air trapped therein until the working chamber again reaches a minimum volume conditon at lobe junction 25. Thereafter, the volume of said chamber increases to a maxmimum under expanding gas pressure and then decreases to a minimum as the chamber comes into communication with the exhaust port at lobe junction 23 to thus complete the cycle. To effect combustion of fuel in each working chamber 28 after substantial compression of air therein, stratified fuel injecton system 10, according to this invention, is provided. The engine housing is maintained within desirable temperature conditions by suitable cooling means which may include fins (not shown) for air cooling or, as shown, cooling liquid flow passages 15 in housing wall 16.

The stratified fuel injection system 10, as shown, is of the type disclosed in the U.S. patent to Gavrun et al, U.S. Pat. No. 3,894,518, but the improvement has application to other stratified fuel injection systems comprising the combination of a fuel injection nozzle and ignition means, such as a spark plug, as are disclosed in the U.S. patents to Bentele, U.S. Pat. Nos. 3,246,636 and Jones, 3,698,364.

As shown in FIGS. 1 and 2, stratified fuel injection system 10 comprises a pilot nozzle 50, an ignition means, such as spark plug 52 immediately adjacent to nozzle 50, and a closely spaced main nozzle 54. In this system located adjacent lobe junction 25 where pressure is high in the working chambers, and since the fuel discharged from pilot nozzle 50 and ignited by spark plug 52 produces a flame which carries into the working chamber to ignite the main fuel flow from nozzle 54, the fuel discharged from pilot nozzle 50 can be adjusted for optimum ignition conditions independently of the engine load and speeds, the main nozzle discharge being adjusted for the engine load and speed conditions. For the efficient operation of any engine, regularlity of ignition is of tremendous importance, and particularly so where, as illustrated, main fuel ignition is dependent upon a pilot frame produced by burning fuel discharged from pilot nozzle 50. To insure ignition regularity, stratified fuel injection system 10 is provided with a heat retention means in the common recess into which the pilot nozzle 50 and spark plug 52 project.

The heat retention means, as illustrated by way of example, is a sleeve 56 which is disposed within a bore 58 in housing wall 16. The bore 58 extends through housing wall 16 to penetrate inner surface 24 of wall 16 and is intersected adjacent inner surface 24 by a partly threaded bore 60. The intersection of bores 58 and 60 form the conventional common recess opening into working chambers 28. The bore 60 is adapted to receive therein spark plug 52. The bore 58 is counterbored at 62 to form an annular shoulder 64 against which abuts an annular shoulder 66 formed by an enlarged diameter portion 68 of sleeve 56. The abutment of shoulders 64 and 66 axially positions sleeve 56 so that its inner end portion 70 lies inwardly of working chambers 28 and in close spaced relation to surface 24 of housing wall 16. If necessary, a spacer or shim 72 may be disposed between shoulders 64 and 66 to properly position the sleeve axially within bore 58. The sleeve 56 is provided with a longitudinal bore 74 therethrough which is adapted to receive therein pilot nozzle 50. Spaced inwardly of end portion 70 of sleeve 56, the bore may have a reduced diameter portion 76 which then continues, in the direction of end portion 70, to form a nozzle 78. The tip 80 of pilot nozzle 50 is positioned in bore portion 76 so as to discharge fuel into sleeve nozzle 78. A lateral opening 82 is provided in the wall of sleeve 56 to communicate sleeve nozzle 78 with bore 60 so that, when the sleeve is in proper position in bore 58, the electrodes 84 and 86 of spark plug 52 lie partly within sleeve nozzle 78. The sleeve 56 may also have a mounting flange 88 to facilitate its connection to housing wall 16 by bolts (not shown) passing through holes 90 and turned into registered, tapped holes (not shown) in housing wall 16. The sleeve 56 is dimensioned to be snugly receivable in bore 58 except for the part in the vicinity of bore portion 76 and sleeve nozzle 78. In this part of sleeve 56, the outside diameter is reduced so that an annular space S is formed between the adjacent outer peripheral surface of the sleeve and the inner surface of bore 58. This space extends from end portion 70 to an annular recess 92 adjacent pilot nozzle tip 80. The space S and recess 92 or heat dam, function to thermally isolate this part of sleeve 56 from the housing wall 16 and the transfer of heat from the sleeve to the cooling liquid flowing in passages 15 via housing wall 16. By so heat insulating the wall of the sleeve defining nozzle 78 from housing wall 16, the wall of sleeve nozzle 78 becomes relatively hot and functions to promote fuel vaporization and thus surer ignition and regularity of such ignition, particularly when the fuel is of low volatility. The interstice between sleeve 56 and bore 58 may be sealed to prevent gas leakage therethrough by spacer 72 acting as a gasket. The sleeve 56 is preferably made of heat resistant material, as for example steel.

In operation of the stratified charge fuel injection system 10 herein described, fuel discharged through nozzle tip 80, as indicated by the broken lines, passes through sleeve nozzle 78. In passage through sleeve nozzle 78 and upon contact with the hot walls of the sleeve nozzle, at least some of the fuel is vaporized and is thereby more readily ignited by the electric arc across electrodes 84 and 86 of spark plug 52. This resultant pilot flame flashes into working chamber 28 and contacts the fuel emitted into the working chamber 28 from the main fuel nozzle 54. This main fuel charge is thus ignited by the pilot flame. Since vaporization of the pilot fuel is promoted by the hot sleeve 78, constancy of fuel ignition is assured. Also where the light-off is of a pilot fuel, a pilot flame of requisite intensity as well as regularity is assured to ignite the main fuel charge and effect substantially complete burning of the fuel. Also carbon deposits in the sleeve nozzle 78 is minimized so that the interference with the fuel spray pattern is obviated.

It is believed now readily apparent that the present invention provides an improved stratified charge fuel injection system in which improved engine performance is achieved in the regularity of ignition, fuel economy and in reduced exhaust emissions. It is also a system which permits the more efficient burning of low octane fuels.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art. For example, insulating space S can be provided for by counterboring bore 56 adjacent sleeve nozzle 78 instead of making the sleeve in that area of reduced outside diameter. Also sleeve 56 may be mounted on the housng by means other than by means of a flange bolted to the housing. The sleeve may be fitted in the bore by an interference or shrink fit or any other suitable means or manner without departure from the scope and spirit of this invention.

What is claimed is:

1. In a rotary internal combustion engine having a housing forming a cavity in which a rotor is eccentrically supported for planetary rotation so as to form a plurality of working chambers defined between the rotor and housing which successively expand and contract in volumetric size as the rotor planetates relative to the housing, the housing being provided with an intake port means for introducing air into the working chambers and exhaust port means for discharging products of combustion from the working chambers, and improved stratified charge fuel injection system comprising:

(a) a first opening and a second opening in said housing intercommunicating with each other and having a common recess opening into the housing cavity;
(b) a fuel injection nozzle disposed in said first opening for discharging fuel into each working chamber through the common recess and after the air charge in the working chamber has been substantially compressed;
(c) an igniter disposed in said second opening for igniting fuel discharging from the fuel nozzle;
(d) a sleeve in said common recess along at least a part of the path of fuel discharge from said fuel injection nozzle; and
(e) said sleeve being dimensioned to define between its outer surface and said common recess an annular space and also having an annular groove in the outer surface thereof inwardly of the end of the sleeve and communicating with the space so that the sleeve retains heat and promotes vaporization of at least some of the fuel passing through said sleeve.

2. In a rotary internal combustion engine having a housing forming a multi-lobe, trochoidal-shaped cavity in which a rotor is supported for planetative, rotative movement and which rotor defines with the housing a plurality of working chambers that expand and contract in volumetric size in response to planetary rotation of the rotor, the housing being provided with an air intake port for introducing air into the working chambers and an exhaust port for discharging products of combustion from the working chambers, an improved stratified charge fuel injection system comprising:

(a) first fuel injection nozzle;
(b) a first opening in the housing communicating with the housing cavity;
(c) a sleeve lining at least that portion of said first opening adjacent the housing cavity so that one end of the sleeve is substantially at the housing cavity;
(d) the sleeve having an internal bore of a configuration to define a discharge recess open to the housing cavity and to receive at least a portion of said first fuel injection nozzle so that fuel emitted by the latter passes through the discharge recess into said working chamber after the air charge therein has been substantially compressed;
(e) said sleeve also being dimensioned to define between its outer surface and said portion of the first opening adjacent the housing cavity an annular space and having an annular groove in the outer peripheral surface thereof communicating with said space inwardly of the said one end of the sleeve so that the sleeve retains heat for promoting vaporization;
(f) a second opening in the housing extending through said sleeve to communicate with said discharge recess;
(g) an igniter disposed in said second opening so as to ignite fuel discharging from the first fuel injection nozzle through the discharge recess; and
(h) a second fuel injection nozzle mounted on said housing for discharging additional fuel into each working chamber while the air charge therein is substantially compressed and located so that at least a portion of its fuel discharge is in the same working chamber region as the fuel discharged from the first fuel injection nozzle to thereby effect ignition of the fuel discharging from the second fuel injection nozzle.

* * * * *